(12) United States Patent
Ready et al.

(10) Patent No.: US 11,326,734 B2
(45) Date of Patent: May 10, 2022

(54) MONOLITHIC GIMBAL FOR A FAST STEERING MIRROR

(71) Applicant: RAYTHEON COMPANY, Waltham, MA (US)

(72) Inventors: Richard Ready, Plano, TX (US); Jeffery M. Gallagher, Princeton, TX (US)

(73) Assignee: RAYTHEON COMPANY, Waltham, MA (US)

( * ) Notice: Subject to any disclaimer, the term of this patent is extended or adjusted under 35 U.S.C. 154(b) by 163 days.

(21) Appl. No.: 16/592,300

(22) Filed: Oct. 3, 2019

(65) Prior Publication Data

US 2021/0102657 A1    Apr. 8, 2021

(51) Int. Cl.
*F16C 11/12* (2006.01)
*F16M 11/12* (2006.01)
*G02B 7/182* (2021.01)

(52) U.S. Cl.
CPC ............. *F16M 11/12* (2013.01); *F16C 11/12* (2013.01); *G02B 7/1821* (2013.01); *F16M 2200/00* (2013.01); *Y10T 74/1293* (2015.01); *Y10T 403/32049* (2015.01)

(58) Field of Classification Search
CPC ..... G02B 7/1821; F16M 11/123; F16C 11/12; Y10T 403/32041; Y10T 403/32049; Y10T 403/45; Y10T 403/54; Y10T 74/1293
See application file for complete search history.

(56) References Cited

U.S. PATENT DOCUMENTS

| 4,261,211 A | * | 4/1981 | Haberland | ............... B23H 9/00 267/160 |
| 4,286,370 A | | 9/1981 | Craig | |
| 4,694,703 A | * | 9/1987 | Routson | ................. G01C 19/22 403/291 |

(Continued)

FOREIGN PATENT DOCUMENTS

DE  102014002182 A1    8/2015
EP    1 887 398     *  2/2008  ............. G02B 7/182

OTHER PUBLICATIONS

International Search Report and Written Opinion of International Patent Application No. PCT/US2020/040437 dated Oct. 9, 2020.
(Continued)

*Primary Examiner* — Michael P Ferguson
(74) *Attorney, Agent, or Firm* — Lando & Anastasi, LLP (57) ABSTRACT

A monolithic gimbal includes a top body portion having a top surface configured to be mounted to a housing, a middle body portion coupled to the top body portion, and a bottom body portion coupled to the middle body portion. The bottom body portion has a bottom surface configured to be mounted to a device. The monolithic gimbal further includes first flexure blades integrally formed with the top body portion and the middle body portion. The first flexure blades enable rotation of the top body portion and the bottom body portion about a first axis. The monolithic gimbal further includes second flexure blades integrally formed with the middle body portion and the bottom body portion. The second flexure blades enable rotation of the top body portion and the bottom body portion about a second axis that is perpendicular to the first axis.

20 Claims, 12 Drawing Sheets

(56) References Cited

U.S. PATENT DOCUMENTS

| | | | |
|---|---|---|---|
| 4,825,713 A * | 5/1989 | Wilkey | G01C 19/22 |
| | | | 74/5 F |
| 2013/0308997 A1 | 11/2013 | Smith | |
| 2018/0209475 A1 | 7/2018 | Balaban et al. | |
| 2018/0252261 A1 * | 9/2018 | Bullard | F16C 11/12 |
| 2020/0200211 A1 | 6/2020 | Gallagher et al. | |

OTHER PUBLICATIONS

Troeger, H., "Considerations in the Application of Flexural Pivots," Automatic Control Data Systems Engineering, (1962), vol. 17, No. 4, pp. 1-6.

* cited by examiner

MONOLITHIC GIMBAL FOR A FAST STEERING MIRROR

GOVERNMENT RIGHTS

Not applicable.

BACKGROUND OF THE INVENTION

Embodiments of the present disclosure relate to support systems, and more particularly to a monolithic gimbal configured to support fast steering mirrors.

Fast steering mirror systems are known and provide the backbone of some conventional sensors and/or video systems. A fast steering mirror is provided to manipulate a reflective surface to control a direction of the reflection of electromagnetic radiation, including light, off of the reflective surface. The fast steering mirror further is configured to steer the reflective surface as a unit, and can be deployable within a sensor or video system, and/or may form part of a vehicle, vessel, or aircraft carrying such a sensor or video system (e.g., an unmanned or autonomous vehicle, vessel, or aircraft).

In some known embodiments, the fast steering mirror includes a fixed base, a pivot flexure or bearing, otherwise referred to as a gimbal, which couples the reflective surface to the base, and several actuators, which move and/or provide additional support to the reflective surface relative to the base. The gimbal provides a primary level of support to the reflective surface while enabling the reflective surface to move with respect to the base. Specifically, in a "normal" position, the reflective surface is configured to direct light in a normal direction away from the fast steering mirror. In a "tilted" position, the reflective surface is configured to direct light at an angle with respect to the normal direction of the fast steering mirror. The gimbal enables the actuators to position the reflective surface at a desired tilt angle.

Commercial and custom-made flex pivots or gimbals are used within the industry. Commercially available gimbals include several constituent components and parts with limited size and load options. Many gimbals include fragile components and multiple parts that are fastened together through different processes. A common method of fabricating a gimbal is to have perpendicular elements in bending, which can require the perpendicular elements to be made of different materials.

SUMMARY OF INVENTION

One aspect of the present disclosure is directed to a monolithic gimbal configured to support a device on a housing. In one embodiment, the monolithic gimbal comprises a top body portion having a top surface configured to be mounted to the housing, a middle body portion coupled to the top body portion, and a bottom body portion coupled to the middle body portion. The bottom body portion has a bottom surface configured to be mounted to the device. The monolithic gimbal further includes at least one first flexure blade integrally formed with the top body portion and the middle body portion. The at least one first flexure blade enables rotation of the top body portion and the bottom body portion about a first axis. The monolithic gimbal further includes at least one second flexure blade integrally formed with the middle body portion and the bottom body portion. The at least one second flexure blade enables rotation of the top body portion and the bottom body portion about a second axis that is perpendicular to the first axis.

Embodiments of the monolithic gimbal further may include configuring the monolithic gimbal to prohibit rotation of the device in third axis that is normal to the first axis and the second axis. The monolithic gimbal further may be configured to prohibit lateral movement of the device in x-axis, y-axis and z-axis directions. A first elongate opening may be formed between the interface of the top body portion and the middle body portion that extends along the first axis and a second elongate opening may be formed between the interface of the middle body portion and the bottom body portion that extends along the second axis. The at least one first flexure blade may be configured to enable rotation of the top body portion with respect to the middle body portion about the first axis and the at least one second flexure blade may be configured to enable rotation of the middle body portion with respect to the bottom body portion about the second axis. A first gap formed between the top body portion and the middle body portion and a second gap formed between the middle body portion and the bottom body portion may define a magnitude of rotation of the top body portion with respect to the middle body portion about the first axis and a magnitude of rotation of the middle body portion with respect to the bottom body portion about the second axis. The at least one first flexure blade may include two flexure blades that extend at 45-degree angles between the top body portion and the middle body portion and are perpendicular to each other on one side of the body portions and two flexure blades that extend at 45-degree angles between the top body portion and the middle body portion and are perpendicular to one another on an opposite side of the body portions. The at least one second flexure blade may include two flexure blades that extend at 45-degree angles between the middle body portion and the bottom body portion and are perpendicular to each other on one side of the body portions and two flexure blades that extend at 45-degree angles between the middle body portion and the bottom body portion and are perpendicular to one another on an opposite side of the body portions. Each flexure blade may have a width and length sufficient to extend from a corner of a respective elongate opening to an opposite corner of the respective elongate opening. Each flexure may have a cross-sectional thickness selected to achieve a desired performance and strength characteristic. The monolithic gimbal may be fabricated from metal, metal alloy or plastic material.

Another aspect of the disclosure is directed to a method of fabricating a monolithic gimbal comprising: providing a blank of material; machining a perimeter and a central opening in the blank; machining pockets in the blank to partially create inner flexure blade features; machining holes in the blank to separate the flexure blade features; machining triangle pockets on an outside of the blank perimeter to create a body of an outside flexure blade; from a side of the blank, performing wire EDM cuts in the blank above a center of rotation of the blank, with the flexible blade features being machined to a desired length and thickness; from a perpendicular side of the blank, performing wire EDM cuts in the blank below the center of rotation of the blank; and creating a hole pop above the center of rotation and a hole pop below the center of rotation on each axis to allow an EDM wire to be inserted to cut out triangles top and bottom.

Embodiments of the method further may include machining the perimeter and the central opening by a computer numerical control (CNC) machine. The method further may include drilling top holes in a top surface of the blank. Machining the holes to separate the flexure blade features may be performed by a drilling process. A width of the flexible blade features may be controlled by a diameter of the center hole and diameters of the holes, with a width of the flexure features being reduced by machining a larger center opening and larger holes and being enlarged by machining a smaller center hole and smaller holes. The method further may include machining a chamfer on a bottom of the blank to reduce the weight of the blank. The method further may include machining a top surface of the blank to make the surface compatible with a device. Performing wire EDM cuts may be performed by a RAM EDM process, which eliminates machining pockets in the blank. The blank may be selected from metal, metal alloy or plastic material.

Yet another aspect of the disclosure is directed to a method of fabricating a monolithic gimbal comprising: injection molding a monolithic gimbal including a top body portion having a top surface configured to be mounted to the housing, a middle body portion coupled to the top body portion, and a bottom body portion coupled to the middle body portion. The bottom body portion has a bottom surface configured to be mounted to the device. The monolithic gimbal further includes at least one first flexure blade integrally formed with the top body portion and the middle body portion. The at least one first flexure blade enables rotation of the top body portion and the bottom body portion about a first axis. The monolithic gimbal further includes at least one second flexure blade integrally formed with the middle body portion and the bottom body portion. The at least one second flexure blade enables rotation of the top body portion and the bottom body portion about a second axis that is perpendicular to the first axis.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Fast steering mirrors generally have a flexure type gimbal for low friction, high repeatability and good stiffness. Embodiments of the gimbal disclosed herein employ a single component gimbal construction that can be manufactured with common machining processes. Flex features of the gimbal are machined into a single component which eliminates the need for joining multiple parts or flexure blades together with fastening methods. In certain embodiments, a single part or monolithic gimbal is provided. The features of the part can be fabricated with typical manufacturing processes. The part geometry prevents damage during handling architecture makes stiffness highly tunable. The simple cuts, compact configuration, elimination of multiple parts and damage resistant features enhance the performance and cost of manufacture of the gimbal.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, middle, upper and lower, and vertical and horizontal are intended for convenience of description, not to limit the present systems and methods or their components to any one positional or spatial orientation.

Figure 1:
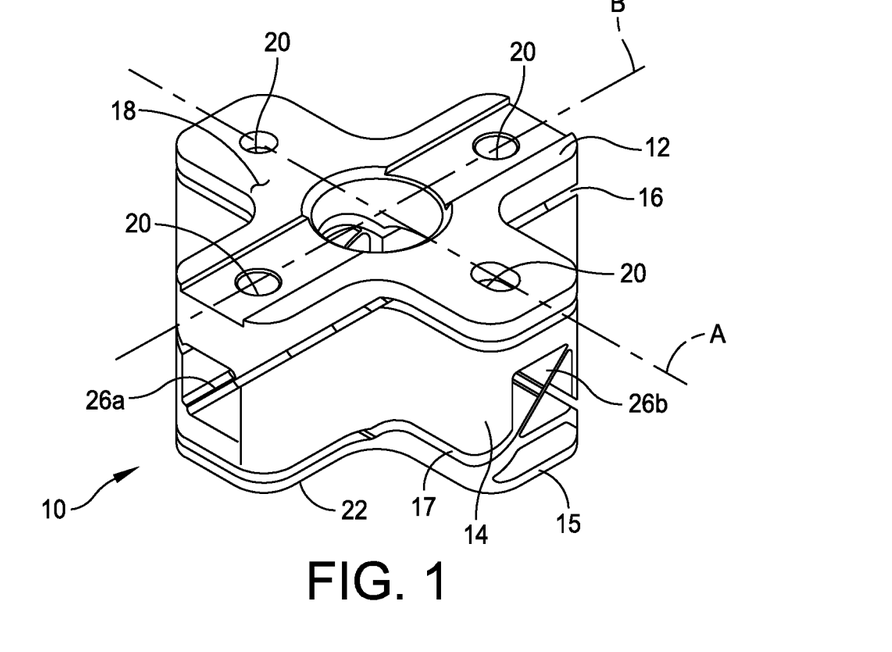
FIG. 1 is a perspective view of a gimbal of an embodiment of the present disclosure.

Referring to the drawings, and more particularly to FIG. 1, there is generally indicated at 10 a monolithic gimbal of an embodiment of the present disclosure. In the shown embodiment, the gimbal 10 is configured to enable tilt and tip of a device, such as a fast steering mirror, mounted on the gimbal 10. Tilt and tip can be defined as enabling rotation of the device in an x-axis direction and a y-axis direction, respectively. The gimbal 10 further is configured to prohibit rotation of the device in a z-axis direction. Moreover, the gimbal 10 further is configured to prohibit lateral movement of the device in the x-axis, y-axis and z-axis directions. As will be described in greater detail below, the gimbal 10 can be shaped and sized to enable a desired amount of tilt and tip. The gimbal design enables a custom flexure pivot that includes perpendicular elements all made from the same part and damage limiting features. Specifically, two pairs of flexure blades are machined at 45-degree angles and are perpendicular to each other. These flexure blades are arranged on each axis to allow tilt and tip rotation to occur.

Figure 2:
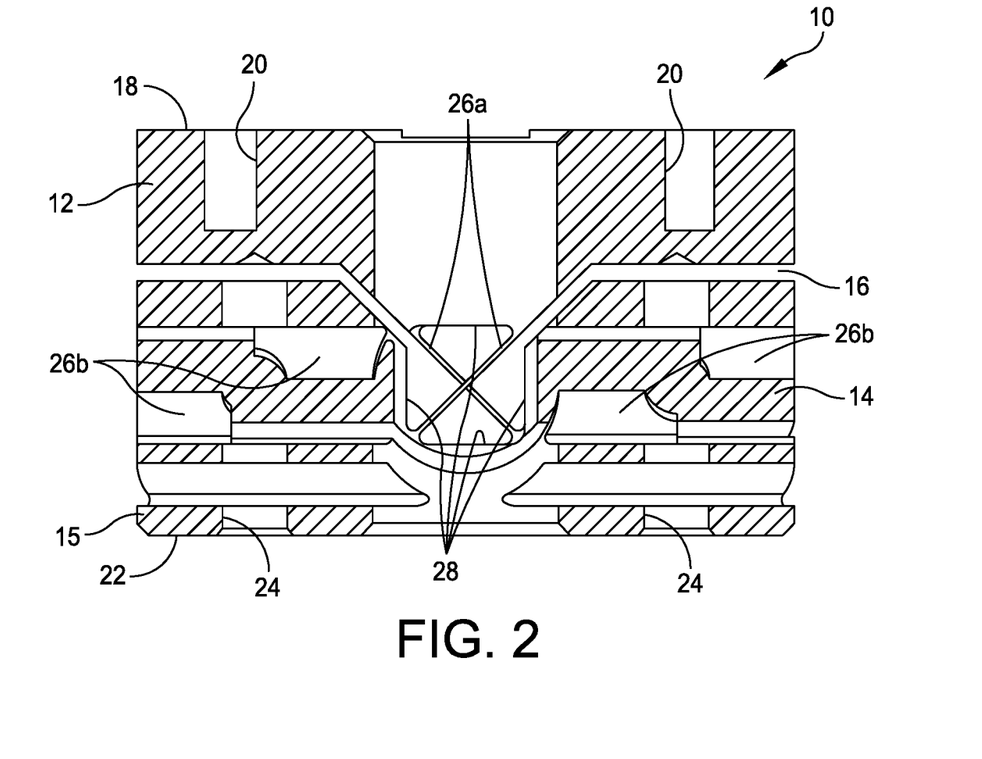
FIG. 2 is a cross-sectional view of the gimbal.
Figure 3:
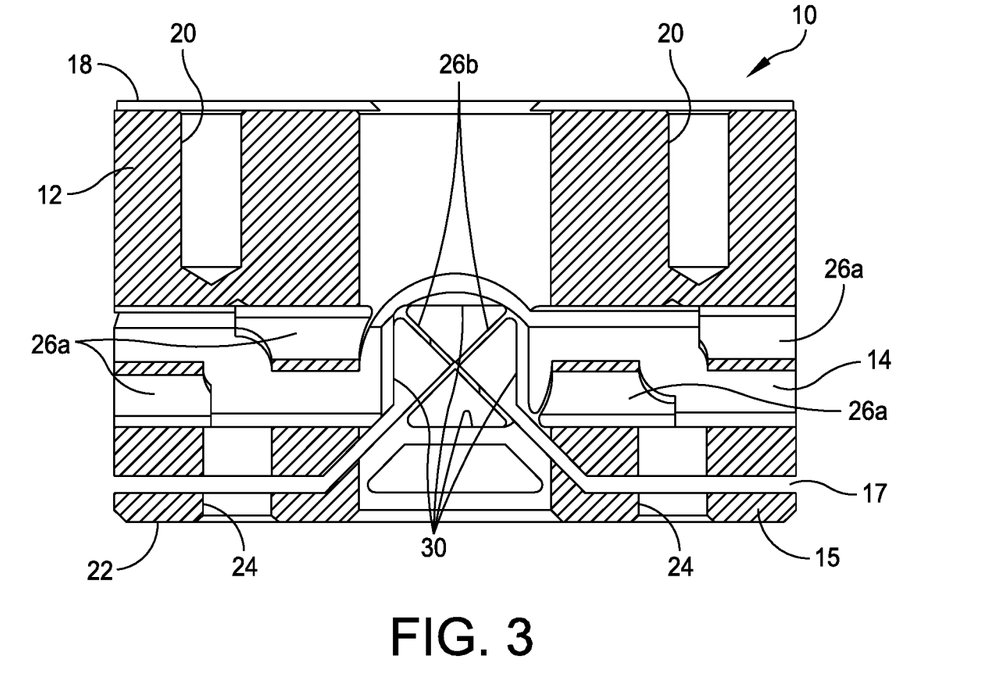
FIG. 3 is another cross-sectional view of the gimbal.

Referring additionally to FIGS. 2 and 3, the gimbal 10 includes a top body portion 12 configured to be secured to a base or other support housing, a middle body portion 14, and a bottom body portion 15 configured to be secured to a device, such as a fast steering mirror. The arrangement is such that the top body portion 12 moves relative to the middle body portion 14 and the bottom body portion 15 in the x-axis and y-axis directions to enable the tilt and tip described herein. A first gap indicated at 16 between the top body portion 12 and the middle body portion 14 effects the amount of tip. A second gap indicated at 17 between the middle body portion 14 and the bottom body portion 15 effects the amount of tilt. In one embodiment, the gimbal 10 is has a length of 0.785 inches, a width of 0.785 inches and a thickness or height of 0.375 inches.

In the shown embodiment, the gap 16 between the top body portion 12 and the middle body portion 14 is 0.030 inches. Similarly, the gap 17 between the middle body portion 14 and the bottom body portion 15 is 0.030 inches. Thus, the amount of tilt and tip of the top body portion 12 is approximately 30 mils. It should be understood that a person skilled in the art and given the benefit of the present disclosure can design the size and dimensions of the gimbal 10 and the gaps 16, 17 to fit a particular need or use. The dimensions and proportions of the gimbal 10 disclosed herein are for illustration purposes only.

In one embodiment, from a top plan view, the gimbal 10 is generally cross-shaped or x-shaped in construction. The top body portion 12 includes a top surface 18 having four mounting holes, each indicated at 20, which are provided to secure the top body portion 12 of the gimbal 10 to a support, for example. The bottom body portion 15 includes a bottom surface 22 having four holes, each indicated at 24, which are provided to separate the flexure blades as described below. The holes 24 further can be used to fasten the gimbal 10 to a device, for example. In one embodiment, the holes 20, 24 can be tapped to threadably receive screw fasteners to secure the gimbal 10 to the base or support and/or the device, respectively. The holes 20, 24 can be used for other purposes as well, such as being configured to operate with another type of fastener system.

Relative movement between the top body portion 12 and the middle body portion 14 is achieved by several flexure blades, each indicated at 26a, and relative movement between the middle body portion 14 and the bottom body portion 15 is achieved by several flexure blades, each indicated at 26b. Several flexure blades 26b are provided in the x-axis direction indicated by arrow A and several flexure blades 26a are provided in the y-axis direction indicated by arrow B to provide the tilt and tip rotation described herein, respectively. In one embodiment, there are four flexure blades 26a integrally secured to the top body portion 12 and the middle body portion 14 since the gimbal 10 is formed from a block of material. These flexure blades 26a provide tilt about the y-axis. Similarly, there are four flexure blades 26b integrally secured to the middle body portion 14 and the bottom body portion 15. These flexure blades 26b provide tip about the x-axis.

FIG. 2 illustrates a cross-sectional view of the gimbal 10 taken along an x-axis direction. The triangularly-shaped openings, each indicated at 28, shown in FIG. 2 extends along a y-axis direction. FIG. 3 illustrates a cross-sectional view of the gimbal 10 taken along the y-axis direction. The triangularly-shaped openings, each indicated at 30, shown in FIG. 3 extends along the x-axis direction. In the illustrated embodiment, four flexure blades 26b are provided along the x-axis direction and four flexure blades 26a are provided along the y-axis direction, although any number of flexure blades can be provided.

Figure 4:
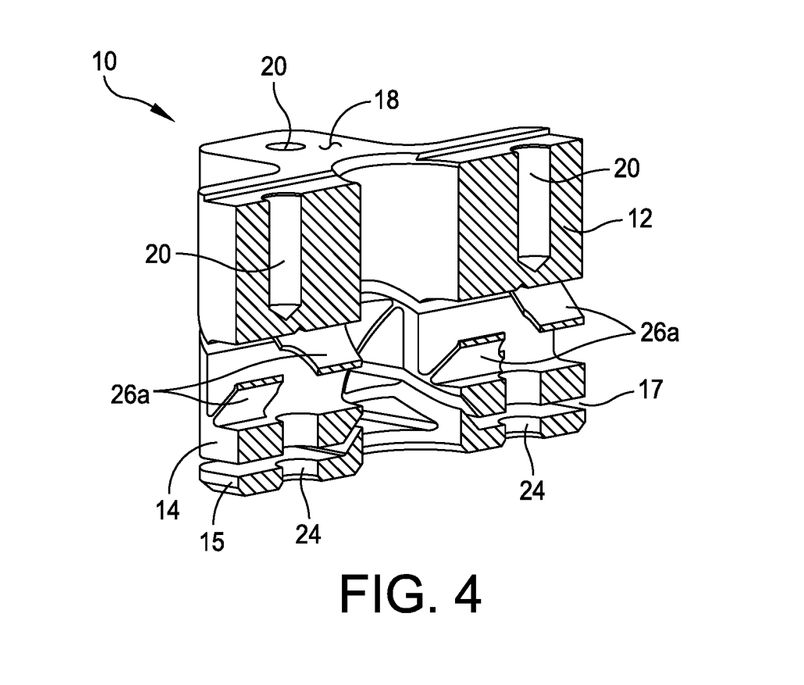
FIG. 4 is a perspective view of the gimbal shown in FIG. 3.

Referring additionally to FIG. 4, the arrangement is such that two flexure blades 26a are provided on each side of the crossing axis of gimbal 10, with one flexure blade 26a extending in a first direction from one corner of the top body portion 12 to an opposite corner of the middle body portion 14 and one flexure blade 26a extending in a second direction from another corner of the top body portion 12 to an opposite corner of the middle body portion 14. As shown, the two pairs of flexure blades 26a extend at 45-degree angles and are perpendicular to each other. This structure provides tilt of the gimbal 10.

Figure 5:
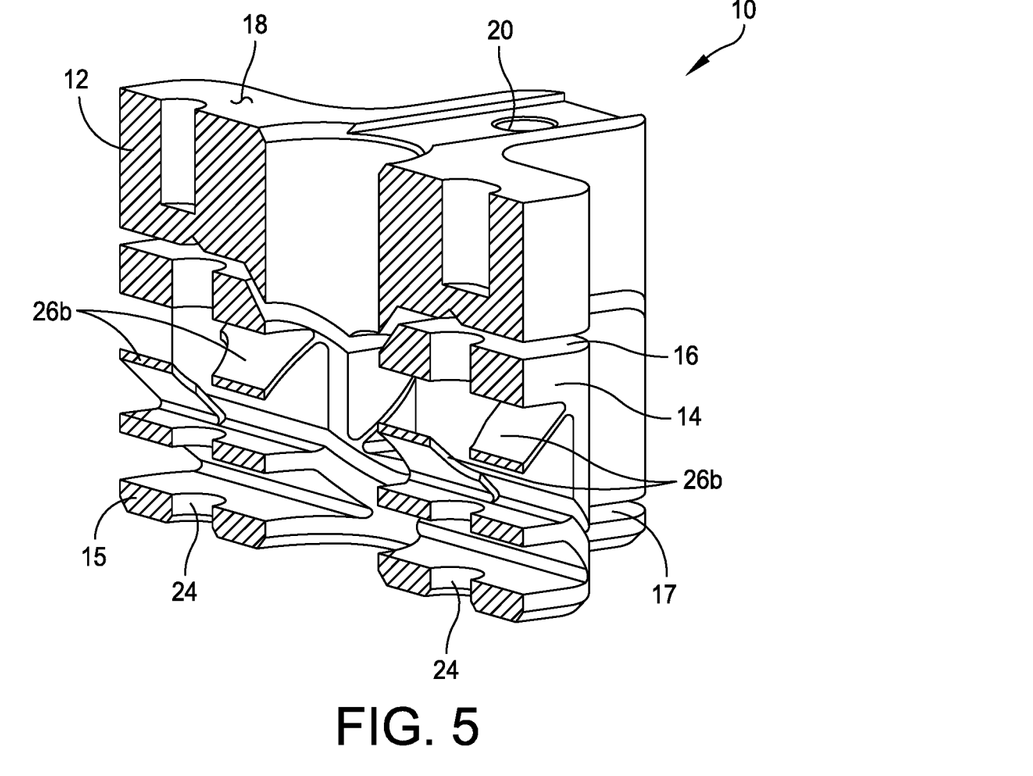
FIG. 5 is another perspective view of the gimbal shown in FIG. 3.

Referring additionally to FIG. 5, similarly, two flexure blades 26b are provided on each side of the crossing axis of gimbal 10, one flexure blade 26b extending in a first direction from one corner of the middle body portion 14 to an opposite corner of the bottom body portion 15 and one flexure blade 26b extending in a second direction from another corner of the middle body portion 14 to an opposite corner of the bottom body portion 15. As shown, the two pairs of flexure blades 26b extend at 45-degree angles and are perpendicular to each other. This structure provides tip of the gimbal 10. The flexure blades 26a, 26b are arranged on each axis to allow tilt and tip rotation to occur. This construction enables rotation of the top body portion 12 with respect to the middle body portion 14 and the bottom body portion 15 in the x-axis and y-axis directions while preventing relative lateral movement of the top body portion 12 with respect to the middle body portion 14 and the bottom body portion 15 in the x-axis, y-axis and z-axis directions. This relative movement is illustrated by way of example in FIG. 6.

As shown in FIGS. 4 and 5, each flexure blade 26a, 26b has a predetermined width and length sufficient to extend from the corner to the opposite corner. A cross-sectional thickness of each flexure blade 26a, 26b and the material constituting each flexure blade 26a, 26b can be manipulated to achieve certain performance and strength characteristics, along with the width of the flexure blade 26a, 26b. The result is the formation of an "x" when viewing the generally triangularly-shaped openings along the x-axis and y-axis directions, with two flexure blades extending from a top corner to an opposite bottom corner and two flexure blades extending from another top corner to an opposite bottom corner.

Figure 6:
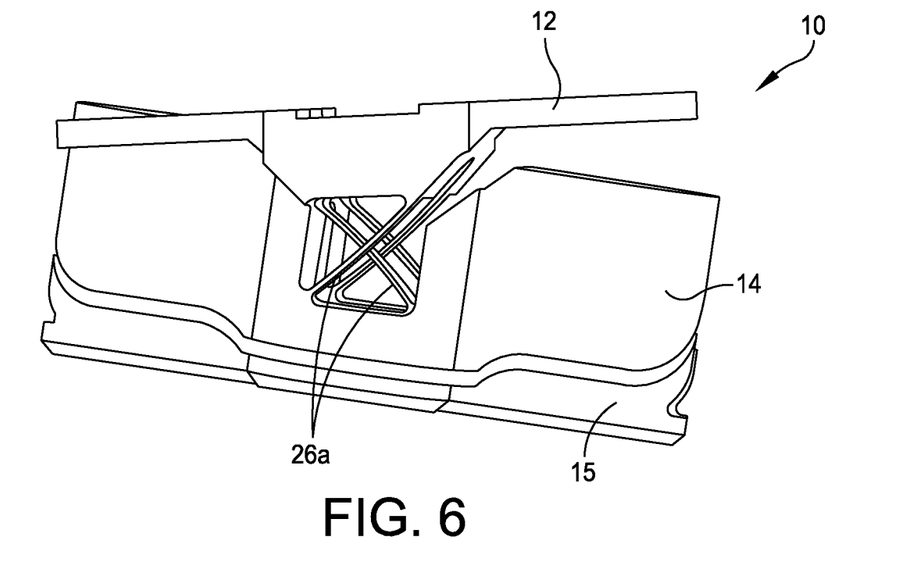
FIG. 6 is a side view of the gimbal in a flex position.

Referring to FIG. 6, the movement of the top body portion 12 with respect to the middle body portion 14 is shown. In this instance, a device, e.g., a mirror, secured to the bottom body portion 15 is moved with respect to a base, e.g., a housing of a sensor assembly, secured to the top body portion 12. The flexure blades 26a enable a limited movement of tilt of the bottom body portion 15 about the y-axis, which is defined by the gap 16 between the top body portion 12 and the middle body portion 14. Similarly, although not shown, the flexure blades 26b enable a limited movement of tip of the bottom body portion 16 about the x-axis, which is defined by the gap 17 between the middle body portion 14 and the bottom body portion 15. Movement can be caused by an external force on the device and/or the base, or by actuators provided in the base to move the bottom body portion 15.

Figure 7:
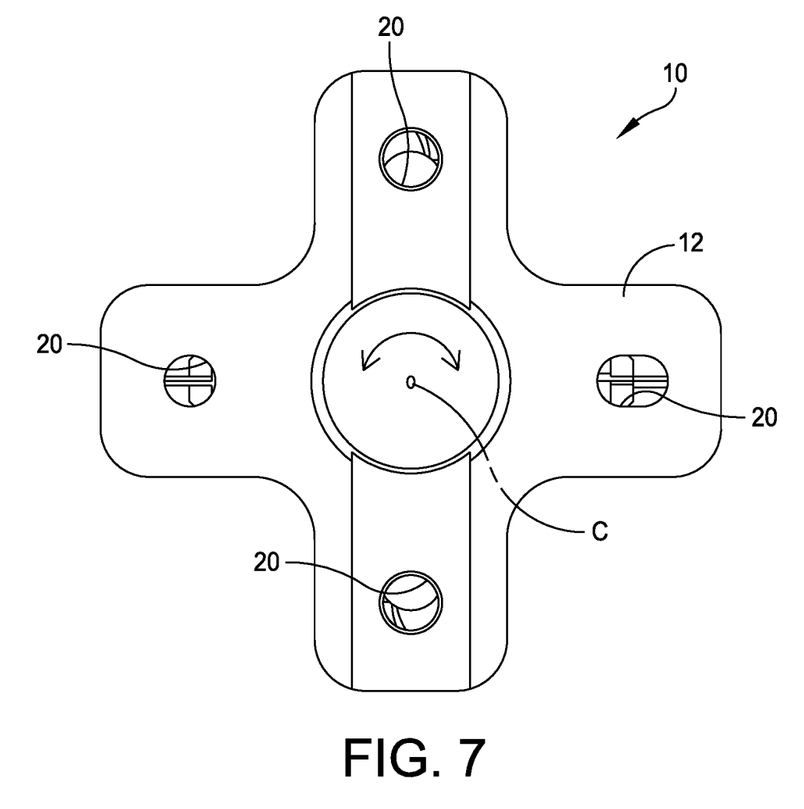
FIG. 7 is a top plan view of the gimbal.
Figure 8:
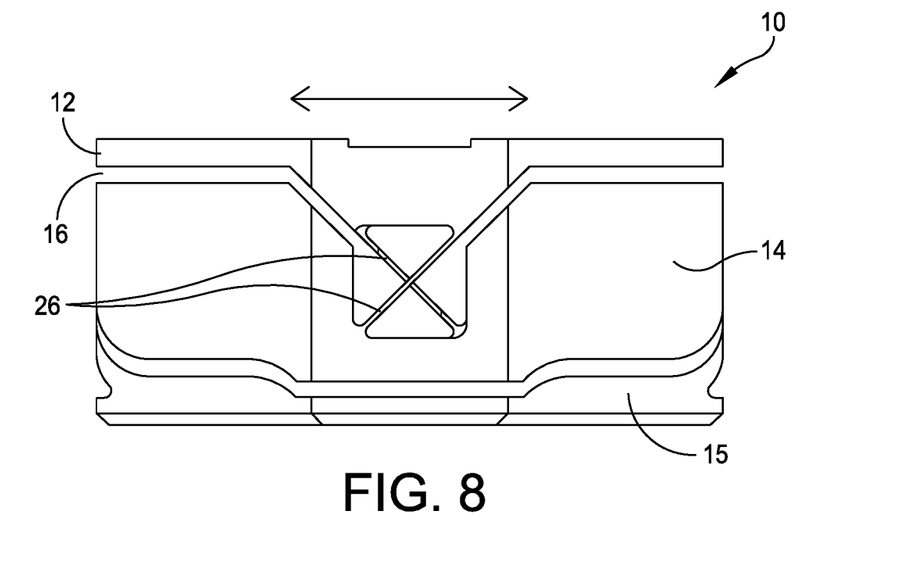
FIG. 8 is a side view of the gimbal.
Figure 9:
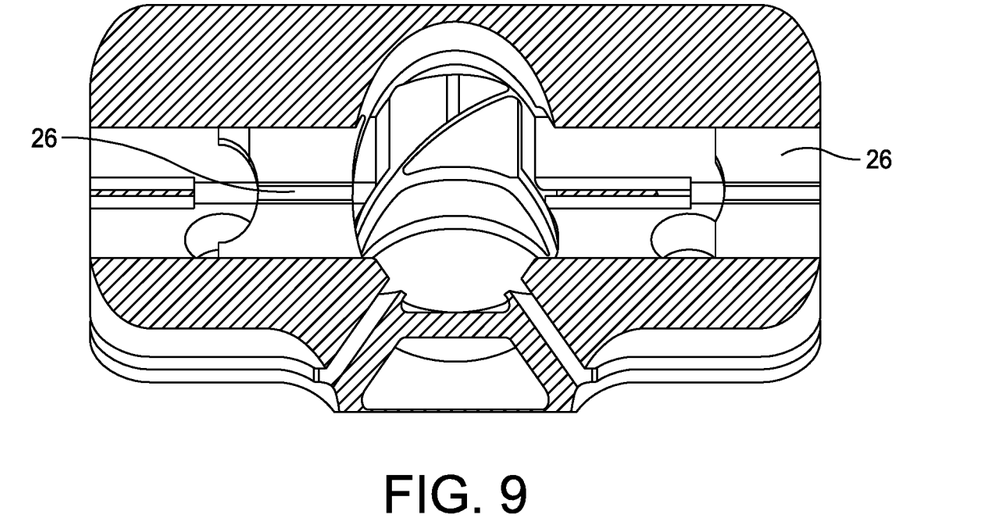
FIGS. 9 and 10 are cross-sectional views of a portion of the gimbal.
Figure 10:
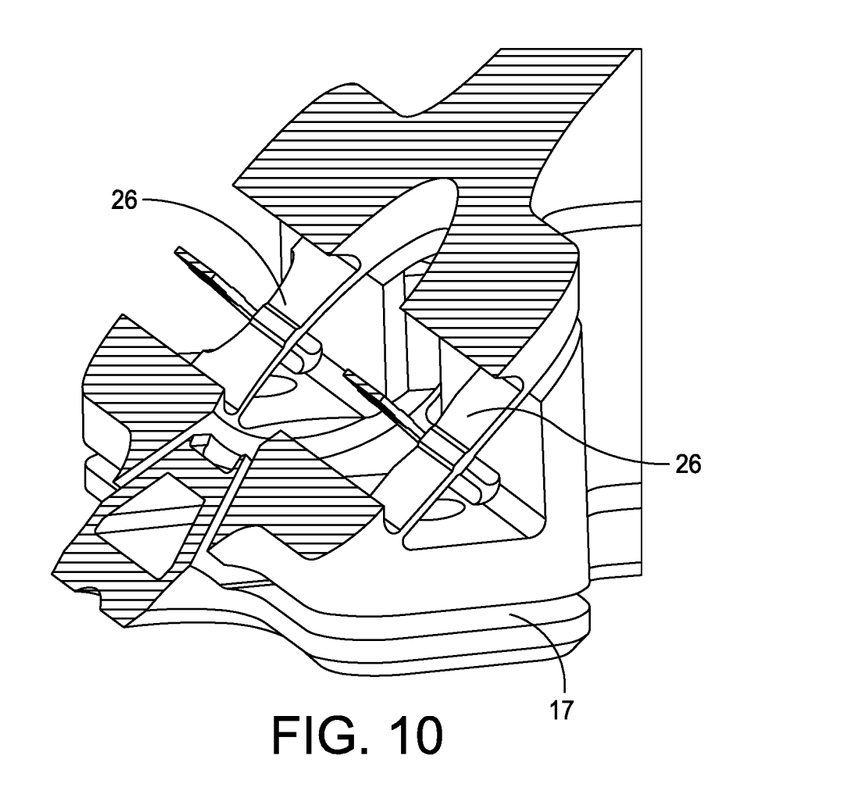

Referring to FIG. 7, movement or rotation of the top body portion 12 with respect to the middle body portion 14 and the bottom body portion 15 and the movement or rotation of the bottom body portion with respect to the middle body portion and the top body portion along a z-axis indicated at C is prevented by the structure of the flexure blades 26a, 26b. Referring to FIG. 8, the translational movement in the x-axis, y-axis and z-axis directions as well as rotational movement about the z-axis of the top body portion 12 with respect to the middle body portion 14 is prevented by the structure of the flexure blades 26a, 26b. As mentioned above, the size and thickness of each flexure blade 26a, 26b and the material used to fabricate the gimbal 10 contribute to the prevention of this unwanted movement. FIGS. 9 and 10 illustrate an exemplary design of the flexure blade, indicated at 26.

As shown, each flexure blade 26 can be shaped and contoured to enable the gimbal 10 to be secured to the device and/or the base, and to provide a desired amount of movement.

Embodiments of the gimbal 10 of the present disclosure can be configured to survive a large gravitational force shock. The compact form factor prevents damage to limiting features while enabling a sprung mass to be balanced easily. The gimbal 10 allows tilt and tip but constrains the four other degrees of freedom. The gaps 16 and 17 can be sized to prevent damage during use and operation. Additionally, the flexure blade design and construction can achieve certain performance and required strength since the gimbal is fabricated from a single piece of material.

Figure 11A:
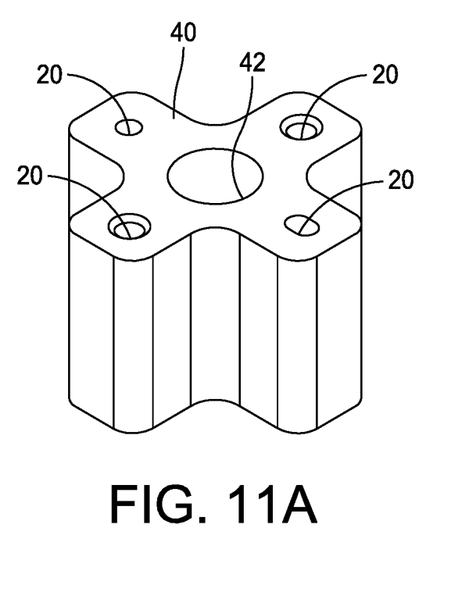
FIGS. 11-21 are views of a sequence of manufacturing steps employed to produce the gimbal.
Figure 11B:
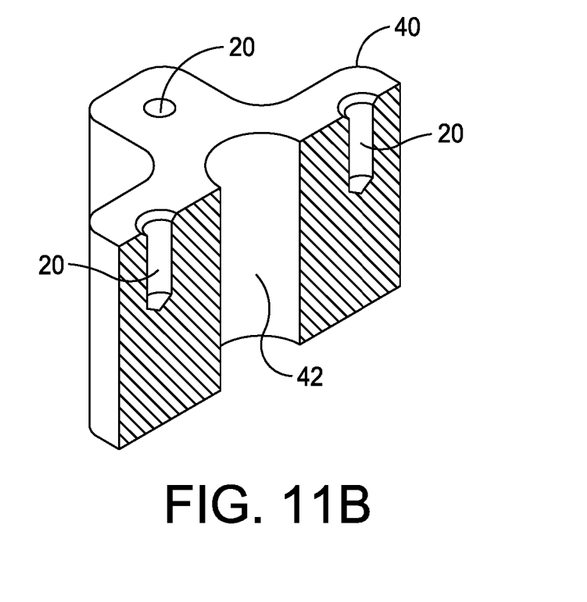

An exemplary manufacturing process is described with reference to FIGS. 11-21. Referring to FIGS. 11A and 11B, a block of material 40 (sometimes referred to as a "blank") is provided to create the gimbal 10. The blank 40 can be provided in the shape and form shown in FIG. 11A, or can be machined to achieve the form shown. Exemplary materials include and are not limited to metals, metallic alloys and plastic. For example, the gimbal 10 can be machined from a blank of titanium, titanium alloy, aluminum and aluminum alloy. The gimbal 10 also can be formed by an additive manufacturing process, such as 3-D printing, or by a molding process, such as injection molding. In the shown embodiment, the blank 40 of material is provided and the manufacturing process involves machining of the material. The perimeter of the gimbal 10 and a central opening 42 can be machined in the blank 40, e.g., by a computer numerical control (CNC) machine. The top mounting holes 20 are machined in the blank 40 by a drilling process. The top mount holes 20 can include a pair of bolted connections and pin slots.

Figure 12A:
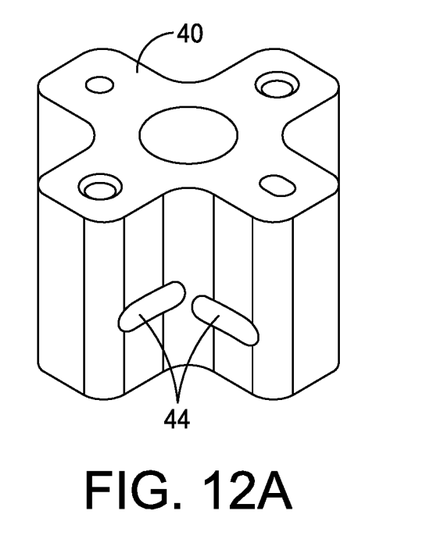
Figure 12B:
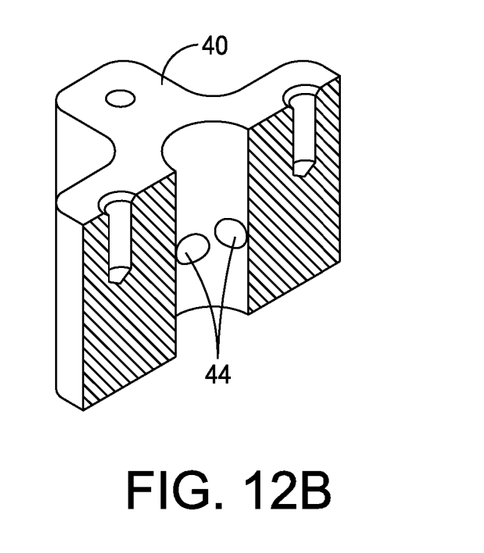

Referring to FIGS. 12A and 12B, pockets, each indicated at 44, are machined in the blank 40 to begin the process of creating an inner flexure blade width dimension. The purpose of the pockets is to smooth out and separate the centers of the flexure blades during manufacture. The pockets are machined at an angle to allow a tool to travel deep enough into the cuts and not break.

Figure 13A:
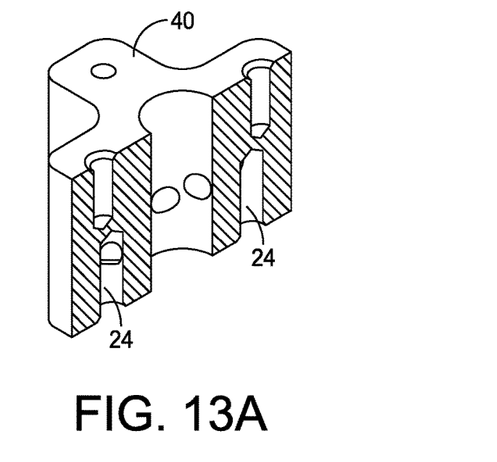
Figure 13B:
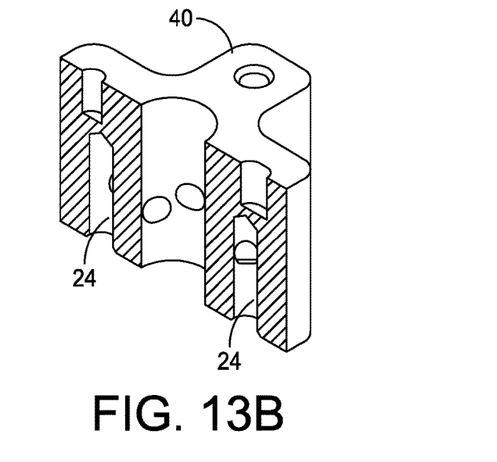

Referring to FIGS. 13A and 13B, the bottom holes 24 are drilled in the blank 40 to separate the flexure blade features. Other bottom holes can also be machined in the blank 40. Controlling the width of the flexure blades indicated at 26 depends on the diameter of the central opening 42 and bottom holes formed in the blank 40. The width of the flexure blade 26 is reduced by machining a larger central opening 42 and larger bottom holes and enlarged by machining a smaller central opening 42 and smaller bottom holes.

Figure 14A:
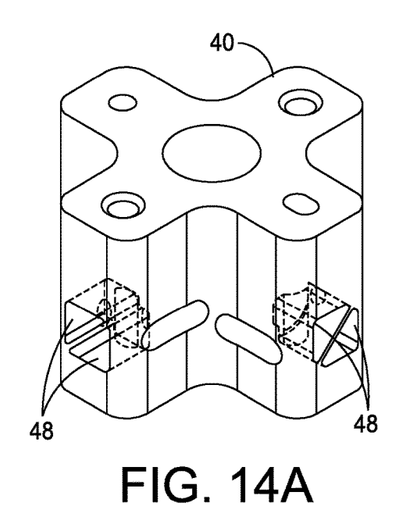
Figure 14B:
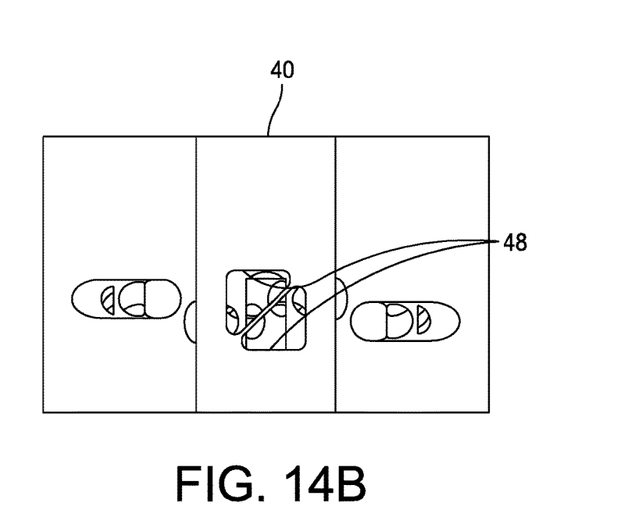

Referring to FIGS. 14A and 14B, after drilling the bottom holes 24, side triangle pockets, each indicated at 48, can be machined on the outside of the perimeter of the blank 40, thereby creating the body of the outside flexure blade 26. This process creates rough dimensions of the outboard flexure blade 26 and allows, and enables an electrical discharge machining (EDM) wire to be inserted into the blank 40 to create the inboard flexure blade 26.

Figure 15A:
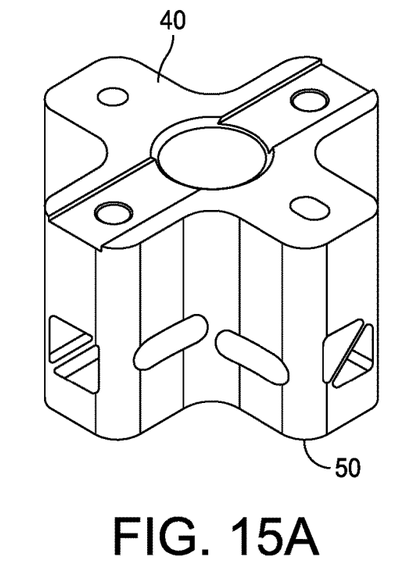
Figure 15B:
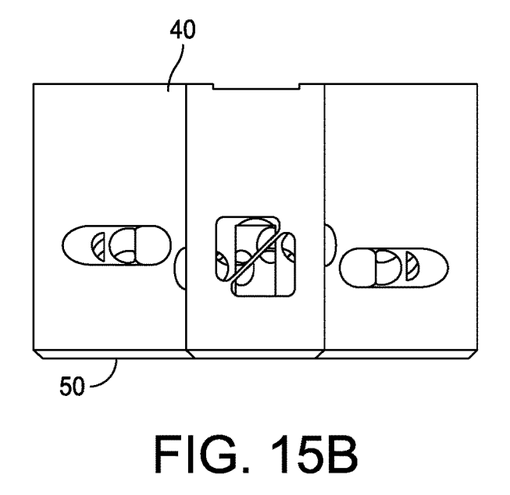

Referring to FIGS. 15A and 15B, a chamfer 50 is machined on a bottom of the blank 40 to reduce the weight of the gimbal 10. Other portions of the blank 40 can be machined to reduce weight as needed. A top of the blank 40 can be machined to make the top surface 18 compatible with a device, e.g., a sensor housing. A bottom of the blank 40 can be machined to make the bottom surface 22 to mount an object, e.g., a mirror.

Figure 16A:
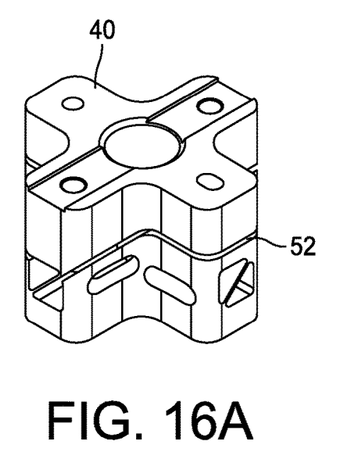
Figure 16B:
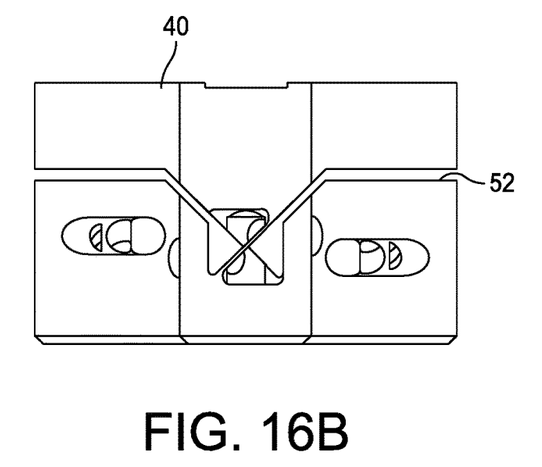

Referring to FIGS. 16A and 16B, from the side, wire EDM cuts 52 are made in the blank 40 beginning above and traveling to the left and the right of a center of rotation, with the flexible blades 26 being machined to a desired length and thickness.

Figure 17A:
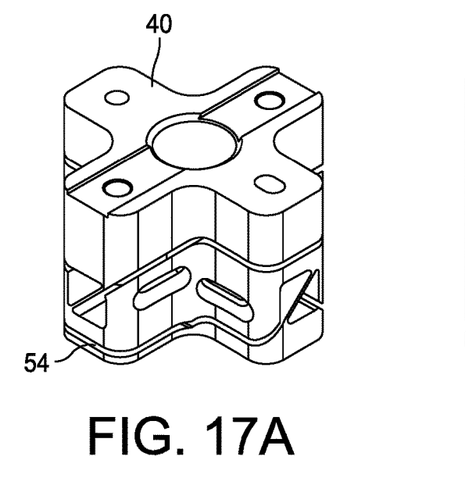
Figure 17B:
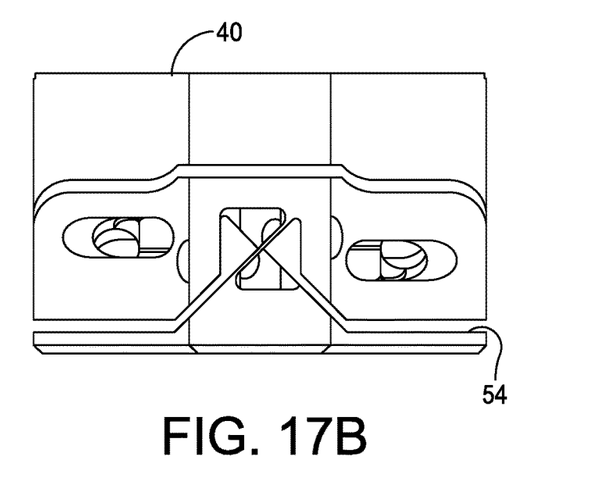

Referring to FIGS. 17A and 17B, perpendicular to the previous wire EDM cuts 52 described with reference to FIGS. 16A and 16B, wire EDM cuts 54 are made in the blank 40 beginning below and traveling to the left and the right of the center of rotation. This process begins to separate the body portions resulting in the formation of the flexure blades 26.

Figure 18A:
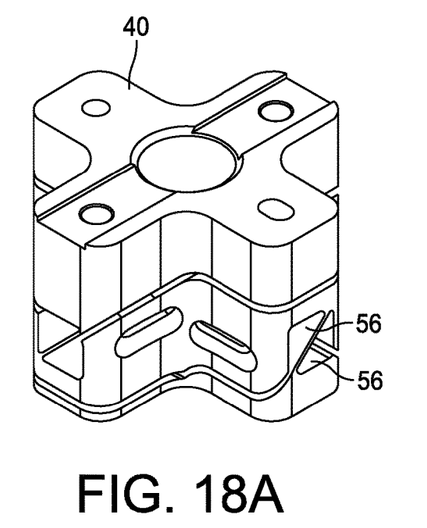
Figure 18B:
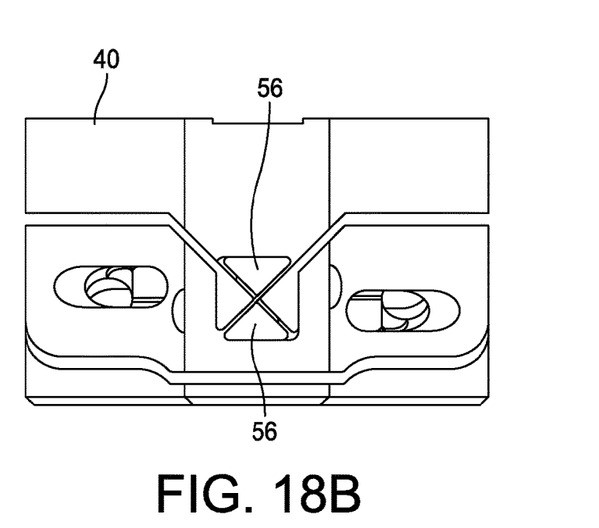

Referring to FIGS. 18A and 18B, a hole pop 56 is created above and below the center of rotation on each axis allowing the EDM wire to be inserted to cut out triangles top and bottom. This process finalizes the dimensions of the flexure blades 26 and the construction of the gimbal 10.

Figures 19A, 20A:
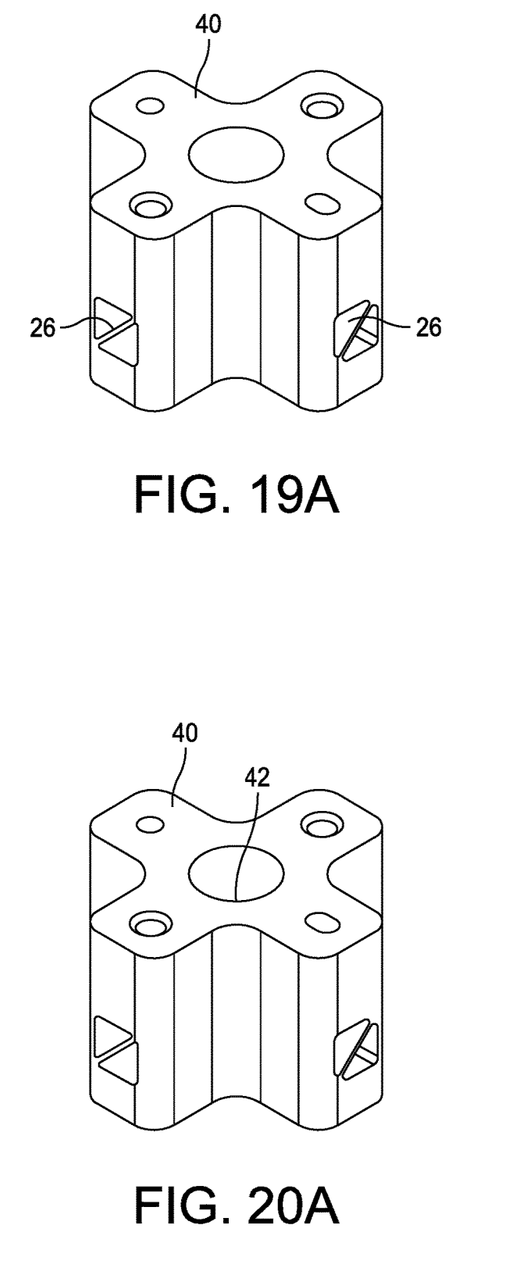
Figures 19B, 20B:
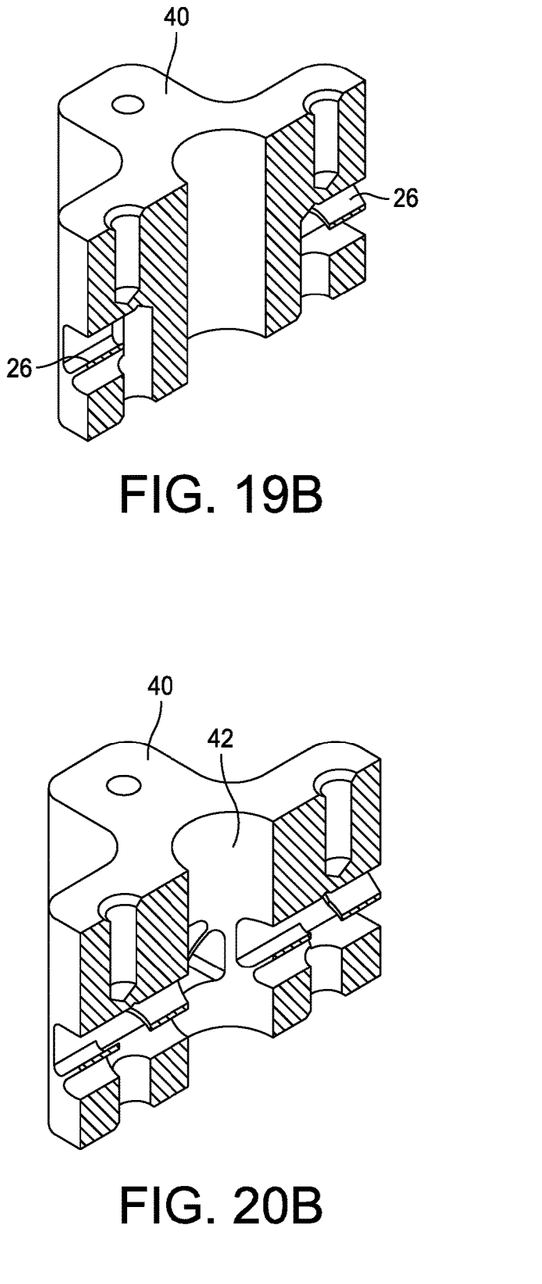

Referring to FIGS. 19A and 19B, instead of wire EDM cutting the flexure blades 26, a RAM EDM process can be employed. In one embodiment a rough RAM EDM pass would cut the outside flexure blades 26.

Figure 20C:
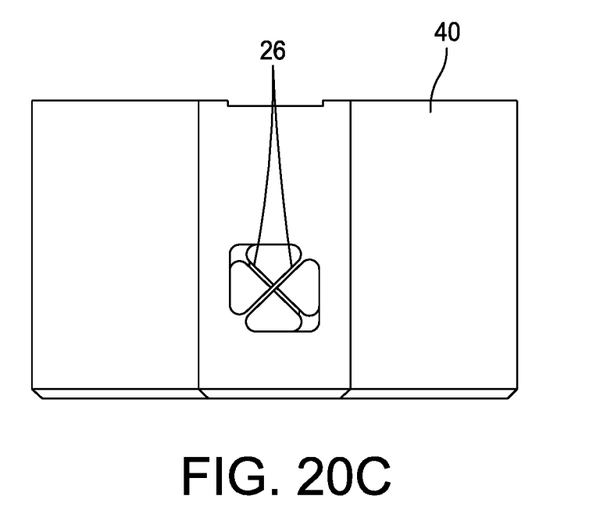

Referring to FIGS. 20A-20C, to cut the inner flexure blades 26, a tool can be inserted from the central opening 42 and pressed into the perimeter of the central opening 42.

Figure 21A:
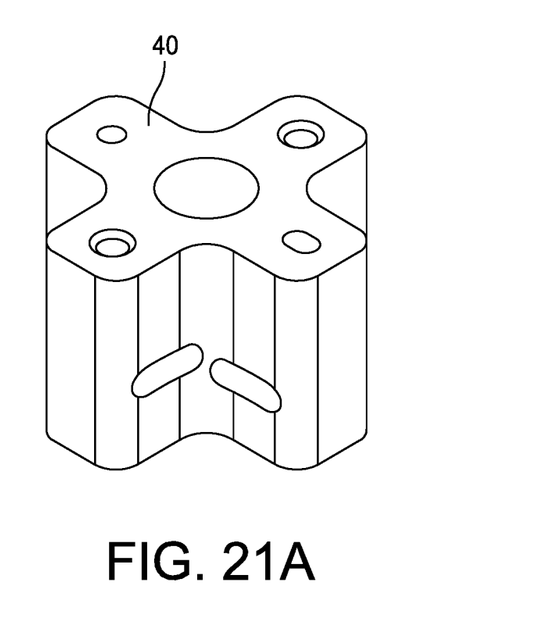
Figure 21B:
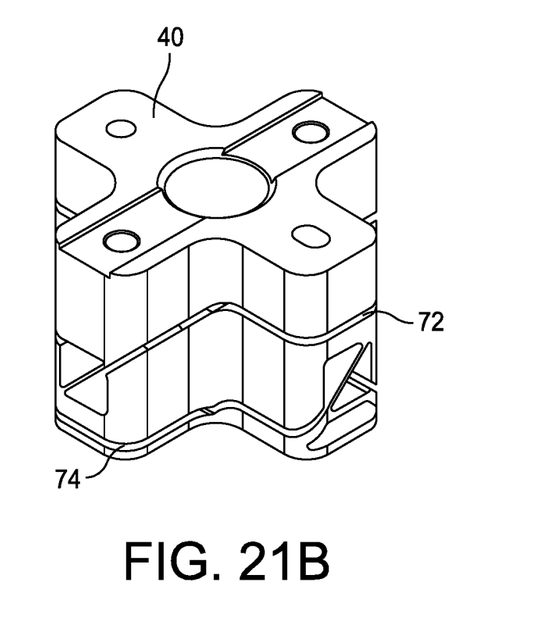

Referring to FIGS. 21A and 21B, after the RAM EDM process, wire EDM cuts 72, 74 can be made above and below the center of rotation, respectively, to allow tip and tilt as shown in processes illustrated in FIGS. 16-18. The RAM EDM process may benefit by eliminating the need for machining the pockets near the center, therefore increasing the stiffness and endurance of the flexure blades 26.

As mentioned, the monolithic gimbal 10 can be fabricated without machining, but instead by an injection molding process.

Embodiments of the gimbal 10 can be modified to suit a particular application. For example, with the gimbal 10 described herein, each axis (x-axis and y-axis) includes four flexure blades indicated at 26 alternatingly formed between the top body portion 12 and the middle body portion 14 along the axis. The number of flexure blades 26 along a particular axis can be modified to influence the performance of the gimbal 10 in a given application. For example, two flexure blades 26 could be provided along each axis, with a flexure blade 26 provided at each wing of the x-shaped gimbal 10. In another embodiment, three flexure blades 26 can be provided along each axis to support the device in a particular orientation in the case an unbalanced load is applied to the device. The orientation of the flexure blades 26 also can be manipulated to achieve a desired performance. Moreover, the size of each flexure blade can be manipulated to influence performance, as well as the size of the gap 16 between the top body portion 12 and the middle body portion 14.

Figure 22A:
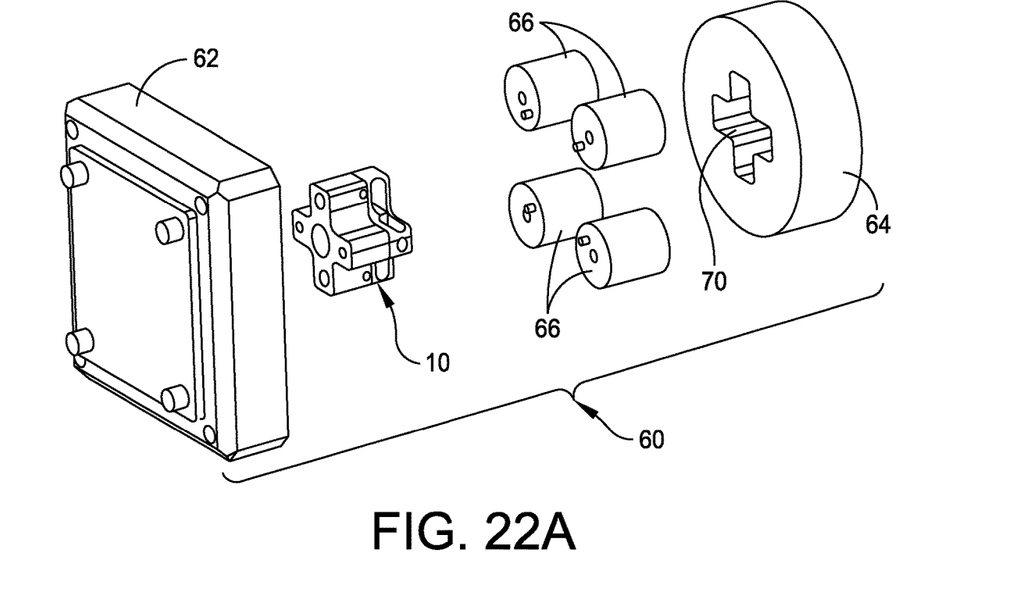
FIGS. 22A and 22B are exploded perspective views of the gimbal being employed within a sensor assembly.
Figure 22B:
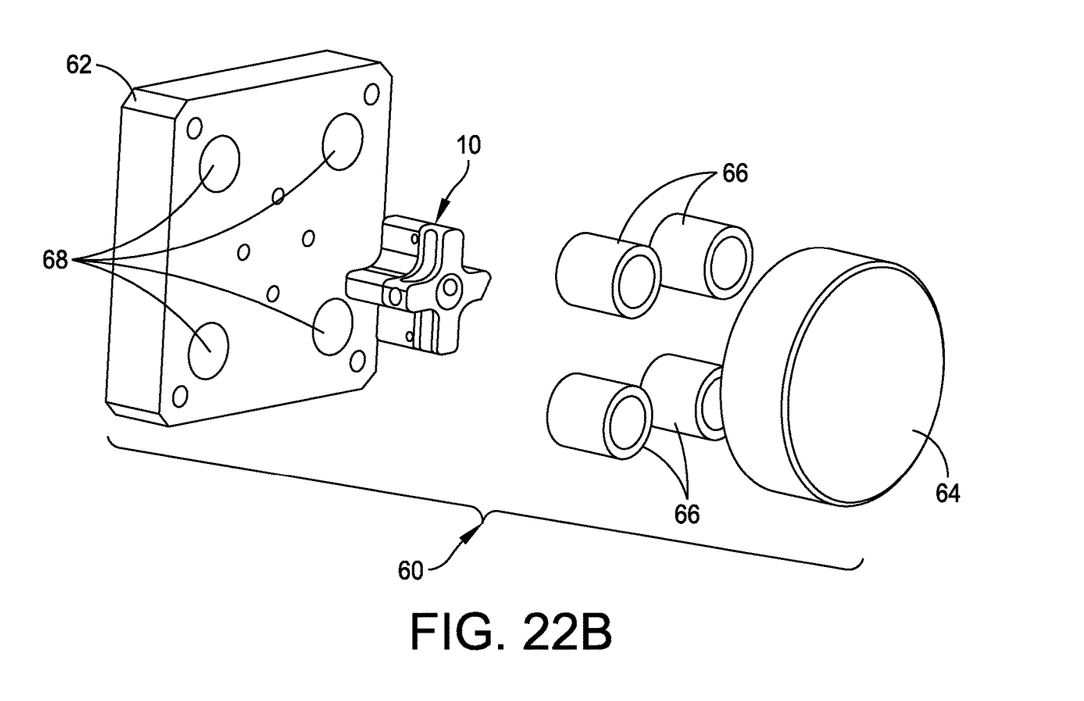

As mentioned above, applications of the gimbal 10 may include using the gimbal 10 in a sensor assembly. In one exemplary application, which is illustrated in FIGS. 22A and 22B, a sensor assembly generally indicated at 60 includes a housing 62 and a device 64, e.g., a fast steering mirror, coupled to the housing 62 by a gimbal 10. As shown, the sensor assembly 60 further can include actuators, each indicated at 66, attached to the housing and received within openings, each indicated at 68, formed in the housing 62. In one embodiment each actuator 66 can embody a voice coil actuator to move the device 64. The top surface 18 of the gimbal 10 is secured to the housing 62 by suitable fasteners, for example. However, it should be noted that the gimbal 10 may be secured to the housing by any suitable method, such as by an adhesive. The bottom body portion 15 of the gimbal 10 is received within an opening 70 formed in the device 64 that is sized and shaped to receive the gimbal 10 therein. In one embodiment, the bottom surface 22 of the gimbal 10 is secured to the device 64 by adhesive, for example.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A monolithic gimbal configured to support a device on a housing, the monolithic gimbal comprising:
    a top body portion having a top surface configured to be mounted to the housing, and an opposing planar bottom surface;
    a middle body portion having a planar top surface facing the bottom surface of the top body portion, and having an opposing planar bottom surface;
    a bottom body portion having a planar top surface facing the bottom surface of the middle body portion, and having a bottom surface configured to be mounted to the device;
    a first elongate opening formed between the interface of the top body portion and the middle body portion, comprising opposing elongate recesses formed within the bottom surface of the top body portion and the top surface of the middle body portion that extends along a first axis;
    a second elongate opening formed between the interface of the middle body portion and the bottom body portion, comprising opposing elongate recesses formed body portion that extends along a second axis, the second axis being formed at a perpendicular angle with the first axis;
    a first set of flexure blades integrally formed with and coupling the top body portion and the middle body portion within the first elongate opening, the first set of flexure blades including a first blade that extends at a 45-degree angle between the top body portion and the middle body portion and a second blade that extends at a 45-degree angle between the top body portion the middle body portion and is perpendicular to the first blade, the first set of flexure blades enabling rotation of the top body portion and the bottom body portion about a first axis; and
    a second set of flexure blades integrally formed with and coupling the middle body portion and the bottom body portion within the second elongate opening, the second set of flexure blades including a third blade that extends at a 45-degree angle between the middle body portion and the bottom body portion and a fourth blade that extends at a 45-degree angle between the middle body portion and the bottom body portion and is perpendicular to the third blade, the second set of flexure blades enabling rotation of the top body portion and the bottom body portion about the second axis that is perpendicular to the first axis.

2. The monolithic gimbal of claim 1, wherein the monolithic gimbal is configured to prohibit rotation of the device in third axis that is normal to the first axis and the second axis.

3. The monolithic gimbal of claim 2, wherein the monolithic gimbal further is configured to prohibit lateral movement of the device in x-axis, y-axis and z-axis directions.

4. The monolithic gimbal of claim 1, wherein the first set of flexure blades are configured to enable rotation of the top body portion with respect to the middle body portion about the first axis, and the second set of flexure blades are configured to enable rotation of the middle body portion with respect to the bottom body portion about the second axis.

5. The monolithic gimbal of claim 4, wherein a first gap formed between the top body portion and the middle body portion and a second gap formed between the middle body portion and the bottom body portion define a magnitude of rotation of the top body portion with respect to the middle body portion about the first axis and a magnitude of rotation of the middle body portion with respect to the bottom body portion about the second axis.

6. The monolithic gimbal of claim 5, wherein the first set of flexure blades includes a fifth blade that extends at 45-degree angles between the top body portion and the middle body portion and a sixth blade that extends at 45-degree angles between the top body portion and the middle body portion and is perpendicular to the fifth blade on an opposite side of the body portions.

7. The monolithic gimbal of claim 6, wherein the second set of flexure blades includes a seventh blade that extends at 45-degree angles between the middle body portion and the bottom body portion and an eighth blade that extends at 45-degree angles between the middle body portion and the bottom body portion and is perpendicular to the seventh blade on an opposite side of the body portions.

8. The monolithic gimbal of claim 7, wherein each flexure blade has a width and length sufficient to extend from a corner of a respective elongate opening to an opposite corner of the respective elongate opening.

9. The monolithic gimbal of claim 8, wherein each flexure has a cross-sectional thickness selected to achieve a desired performance and strength characteristic.

10. The monolithic gimbal of claim 1, wherein the monolithic gimbal is fabricated from metal, metal alloy or plastic material.

11. A method of fabricating the monolithic gimbal of claim 1, the method comprising:
    providing a blank of material;
    machining a perimeter and a central opening in the blank;
    machining pockets in the blank to partially create inner flexure blade features;
    machining holes in the blank to separate the flexure blade features;
    machining triangle pockets on an outside of the blank perimeter to create a body of an outside flexure blade;
    from a side of the blank, performing wire EDM cuts in the blank above a center of rotation of the blank, with the flexible blade features being machined to a desired length and thickness;
    from a perpendicular side of the blank, performing wire EDM cuts in the blank below the center of rotation of the blank; and
    creating a hole pop above the center of rotation and a hole pop below the center of rotation on each axis to allow an EDM wire to be inserted to cut out triangles top and bottom.

12. The method of claim 11, wherein machining the perimeter and the central opening is performed by a computer numerical control (CNC) machine.

13. The method of claim 11, further comprising drilling top holes in a top surface of the blank.

14. The method of claim 13, wherein machining the holes to separate the flexure blade features is performed by a drilling process.

15. The method of claim 11, wherein a width of the flexible blade features is controlled by a diameter of the center hole and diameters of the holes, a width of the flexure features being reduced by machining a larger center opening and larger holes and being enlarged by machining a smaller center hole and smaller holes.

16. The method of claim 11, further comprising machining a chamfer on a bottom of the blank to reduce the weight of the blank.

17. The method of claim 11, further comprising machining a top surface of the blank to make the surface compatible with a device.

18. The method of claim 11, wherein performing wire EDM cuts are performed by a RAM EDM process, which eliminates machining pockets in the blank.

19. The method of claim 11, wherein the blank is selected from metal, metal alloy or plastic material.

20. A method of fabricating a monolithic gimbal comprising:
injection molding the monolithic gimbal of claim 1.

* * * * *